Sept. 14, 1965  J. R. SPEER  3,205,721
SABER SAWS

Filed June 13, 1960  3 Sheets-Sheet 1

INVENTOR
John R. Speer

BY *Strauch, Nolan + Neale*

ATTORNEYS

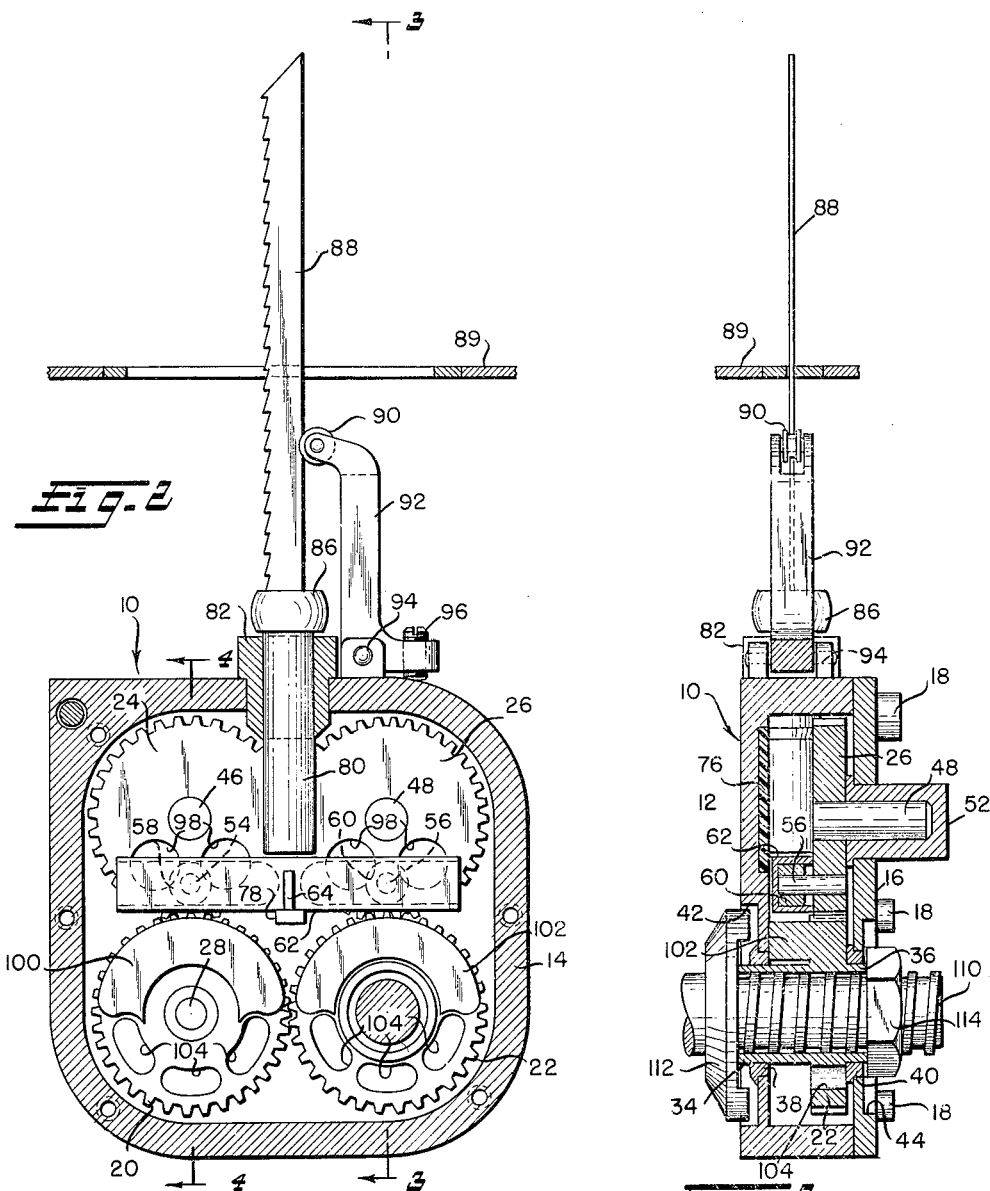

Sept. 14, 1965   J. R. SPEER   3,205,721
SABER SAWS
Filed June 13, 1960   3 Sheets-Sheet 3
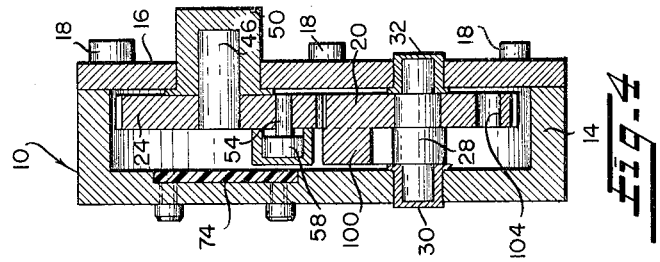
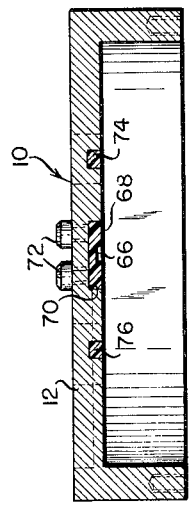
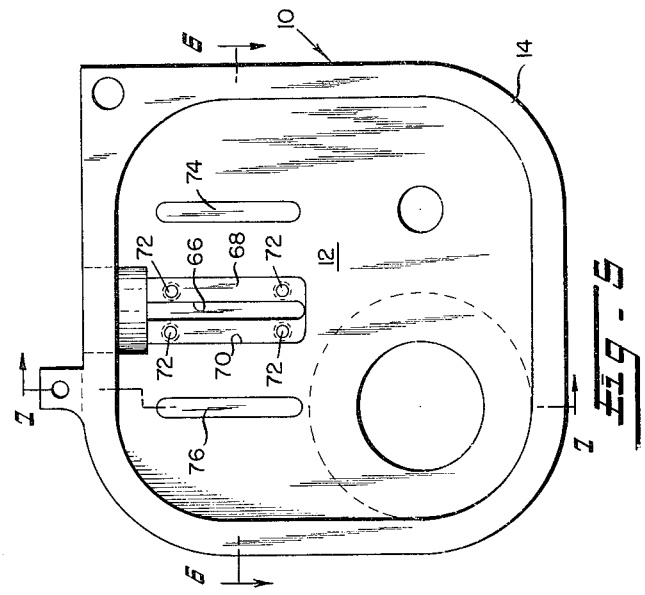
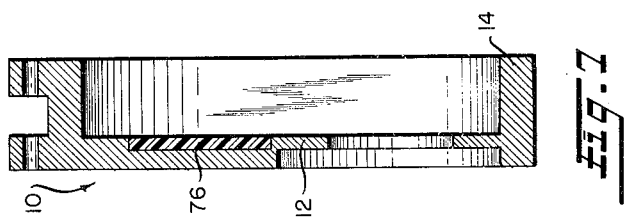
INVENTOR
John R. Speer
BY *Strauch, Nolan & Neale*
ATTORNEYS

United States Patent Office 3,205,721
Patented Sept. 14, 1965

3,205,721
SABER SAWS
John R. Speer, Pittsburgh, Pa., assignor to Rockwell Manufacturing Company, Pittsburgh, Pa., a corporation of Pennsylvania
Filed June 13, 1960, Ser. No. 35,475
6 Claims. (Cl. 74—50)

This invention relates to power operated saws of the reciprocating type known as saber saws, and more particularly to saber saws which are adapted to be attached to any drive shaft such as the arbor of a table saw.

As is well known in the art, the popularity of tools such as drill presses, power saws and like power driven tools in the home workshop field is due in large measure to their versatility and the ease with which they can be adapted for different uses.

To further increase the versatility of these units, many attachments are offered commercially to supplement or replace the basic tool. One such attachment particularly adapted for use with a tilting arbor saw is a saber saw as disclosed for example in United States Patent 2,842,171. While this attachment produces good results it is relatively bulky and its installation, while not difficult, is relatively time consuming and must be done with care to insure proper positioning of the attachment and alignment of the drive pulley with the motor pulley.

Further, since it is mounted at a substantial distance from the axis of the mounting for the main tool, it is not as fully adjustable as the main saw and cannot be positioned by the controls provided for the main saw.

The saber saw of the present invention constitutes a distinct improvement over this type of prior device and similar devices in that it is attachable as a unitary assembly directly to the main saw arbor in essentially the same manner as the usual circular saw which it replaces.

It is accordingly an object of the present invention to provide improved saber saw attachments for power tools which are attachable as a unit to the main tool power shaft and which thus may be installed, removed and adjusted with a degree of ease not approached by prior devices.

It is a further object of the present invention to provide improved saber saws which are dynamically balanced to minimize vibration and noise even for very high speed operations.

It is an additional object of the present invention to provide improved compact saber saw attachments for power tools which are attachable with a minimum of effort and without modification of the main tool.

It is also an object of the present invention to provide improved saber saw attachments which are more stable and more accurate than the devices of the prior art since they are internally balanced and are mounted directly on the main tool support.

It is a further object of the present invention to provide a saber saw attachment which is simple and rugged in construction and which will maintain its accuracy over an extended service life.

Additional objects and advantages will become apparent as the description proceeds in connection with the accompanying drawings in which:

FIGURE 2 is a vertical section of the saber saw taken along line 2—2 of FIGURE 1;

FIGURE 3 is a vertical section taken along line 3—3 of FIGURE 2;

FIGURE 4 is a vertical section taken along line 4—4 of FIGURE 2;

Figure 1:
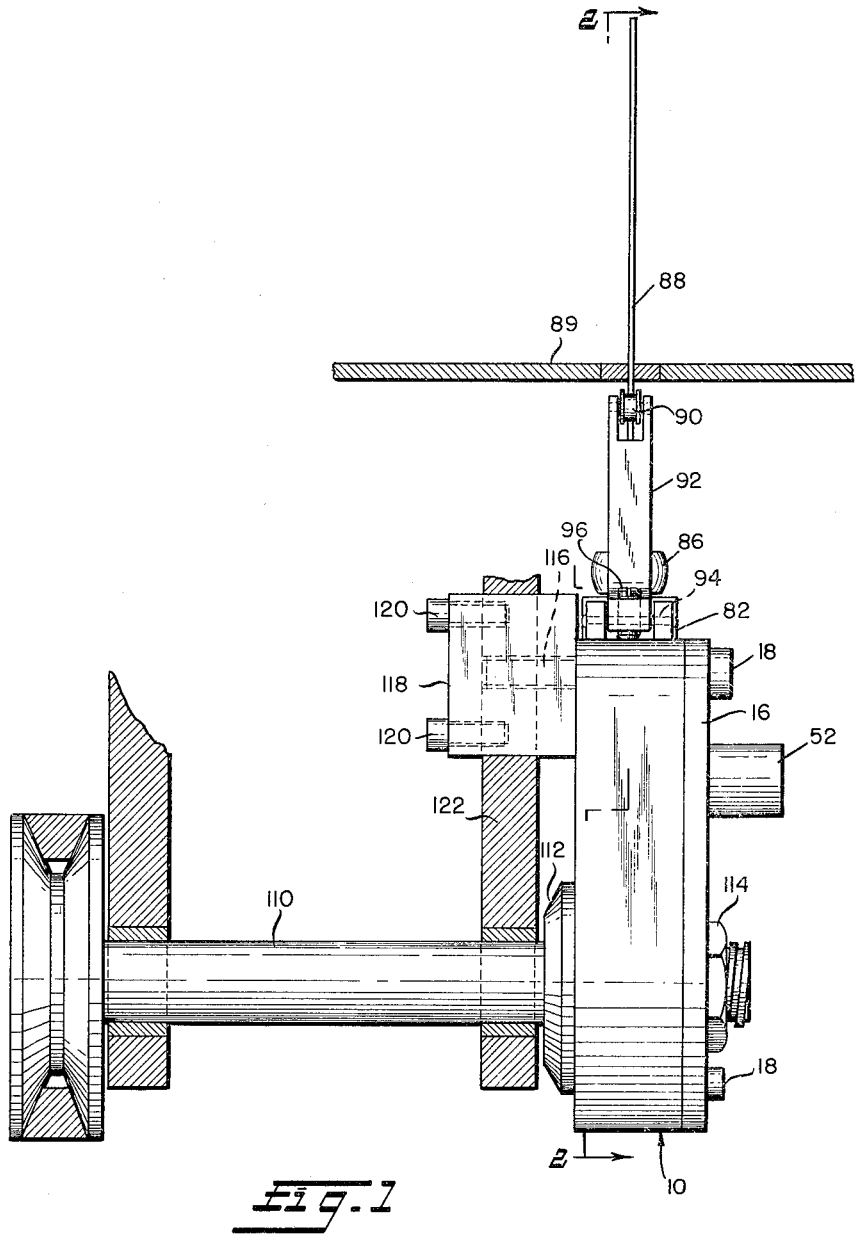
FIGURE 1 is a side elevation of the saber saw of the present invention installed for use on the arbor of a tilting arbor saw.

FIGURE 5 is a front elevation of the main housing with certain internal parts removed; and FIGURES 6 and 7 are sections taken along line 6—6 and 7—7, respectively, of FIGURE 5 showing details of construction.

Substantially the entire saw assembly of the present invention is enclosed in a cast housing 10 which is generally of dish-shaped form and is provided with a substantially flat bottom wall 12 and a continuous side wall 14. The housing 10 is closed by a cover plate 16 which is secured to the rim of the housing by a plurality of cap screws 18. Rotatably mounted within the housing 10 is a first pair of gears 20, 22 and a second pair of gears 24, 26. As best shown in FIGURE 2, each of the gears meshes with two adjacent gears and since the gears are all of the same size and have the same number of peripheral teeth, all of the gears rotate at the same angular speed. The opposite ends of the gear shaft 28 which is press-fitted into a central opening in the gear 20 are rotatably received in Phosphor-bronze bearings 30 and 32, press-fitted into respective aligned openings in the housing 10 and the cover plate 16. It will be noted that the gear 20 is closely confined by the shoulders of the bushings 30 and 32 against axial movement.

The gear 22 is provided with an integral cylindrical hub having oppositely extending projections 34 and 36 which are rotatably received in respective Phosphor-bronze bushings 38 and 40 press-fitted into aligned openings in the body and cover plate, respectively. The gear 22 is also confined against axial movement by the shoulders of the bearings 38 and 40. It will be noted that the ends of the hub portions 34 and 36 project slightly beyond the ends of the associated bearings to permit the ends of the hub of gear 22 to be clamped to a shaft as shown in FIGURES 1 and 3. Also to facilitate the clamping of the ends of the gear 22 to a shaft or similar drive mechanism without interference with the bottom wall of the housing 10 or the outer surface of the cover plate 16, these members are provided with circular recesses 42 and 44 concentric with the axis of the gear 22.

The gears 24 and 26 which are of identical construction are carried by respective shafts 46 and 48 press-fitted into central bores in the gears. The projecting ends of the shafts 46 and 48 are cantilever supported for rotation in Phosphor-bronze bearings 50 and 52 press-fitted into openings in the cover member 16 to dispose the shafts 46 and 48 at the same level and to dispose the axes of the gears 24 and 26 directly above the axes of the gears 20 and 22, respectively.

Rotatably mounted on pins 54 and 56 press-fitted into openings in the gears 24 and 26 are nylon rollers 58 and 60 which are received with a close clearance fit in a U-shaped cross head 62. The cross head 62 is guided for vertical movement by a projection 64 formed on its flat rear face which travels in a groove 66 formed in a bronze insert 68 held in a recess 70 in the bottom wall 12 of the housing by socket head screws 72. The flat rear surface of the cross head 62 rides on vertically extending Phosphor-bronze bearing inserts 74 and 76 press-fitted into suitable recesses in the bottom wall 12 of the main housing. The bearing inserts 74 and 76 project outwardly beyond the surface of the bottom wall 12 of the housing sufficiently to maintain the edges of the cross head channel closely adjacent the surfaces of gears 24 and 26.

Attached by a screw 78 to the cross end 62 is a plunger 80 which extends vertically upward through a bushing 82 press-fitted into an opening in the wall 14 of the housing 10. A chuck (not shown) of conventional construction is received in a bore in the upper end of the plunger 80 and is releasably clamped in place by a collar 86. The chuck is adapted to hold a replaceable saw blade 88 of conventional construction which extends through an opening in the saw table 89. As shown in FIGURE 2, the saw blade is backed with a uniform pressure by a roller 90 carried by an arm 92 pivotally secured as at 94 to the outer surface of the casing 10. The pressure exerted by the roller 90 against the rear edge of the blade 88 can be adjusted by a screw 96.

It is a feature of the invention that the entire saw assembly is dynamically balanced and is thus capable of very high speed operation with a minimum of noise, vibration and wear.

This is accomplished by unbalancing the rotating members which act in balanced relation to each other to establish a net force which is equal and opposite to the force produced by the reciprocating members. Specifically, the upper gears 24 and 26 are provided with pairs of lightening holes 98 on the same side of the gear axis as the pins 54 and 56. Since the vertical motion of these holes is the same as the vertical motion of the reciprocating members, they partially offset the unbalance produced by the latter. Since the gears 24 and 26 rotate oppositely, the holes do not introduce any lateral unbalance.

The remaining and major portion of the unbalanced force created by the reciprocating parts is balanced by counterweights 100 and 102 which are formed integrally on the gears 20 and 22, respectively, and by the lightening holes 104 provided in each of these gears. It will be noted from FIGURE 2 that when the saw is at the bottom of its stroke, the counterweights 100 and 102 are at their limit of upward movement, so that the forces produced by the counterweights and by the reciprocating parts act in opposite directions. The counterweights 100 and 102 are substantially aligned with the reciprocating parts so that the forces produced on the parts are not only substantially equal and opposite but are effective in substantially the same plane thus minimizing any tendency to twist the saw casing. Again, since the counterweights 100 and 102 are of equal size and since the gears 20 and 22 rotate in opposite directions, the counterweights do not introduce any lateral unbalance.

As stated above, the saw assembly is adapted to be clamped directly to any rotating shaft. A typical installation is shown in FIGURE 1 where the unit is clamped to the arbor 110 of a tilting arbor saw of conventional construction using the washer 112 and the nut 114 which are provided with the saw to clamp the circular cutting disc normally employed with such a machine. The dimensioning and positioning of the gear 22 is such that neither the washer 112 nor the nut 114 contact any of the stationary parts of the mechanism. Rotation of the entire saw assembly is prevented by a bolt 116 which extends through the entire assembly into a clamp 118 which is securely locked by screws 120 to the arbor support arm 122. Since the saw assembly is supported on the arbor and the arbor support arm, it is fully adjustable in the same manner as the usual circular saw by manipulation of the normal saw controls in the usual manner which substantially increases the versatility of the saber saw attachment.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A saber saw for attachment to a driven shaft comprising a casing having a pair of opposed walls, each being provided with a through opening to accommodate said shaft; a first pair of meshed gears mounted in said casing for rotation about parallel axes, one of said gears having a hub opening aligned with said casing openings, said one of said gears being constructed to be drivingly attached to said shaft; a second pair of meshed gears mounted in said casing for rotation about axes parallel to the axes of rotating of said first pair of gears, the respective gears of said second pair being in mesh with the gears of said first pair to be driven thereby; a saw carrier mounted in said casing for reciprocating movement, counterweights carried by each of said first pair of meshed gears essentially in the plane of reciprocation of said saw carrier, and means connecting said second pair of gears and said carrier and operable to convert rotary motion of said gears into reciprocation of said carrier.

2. A saber saw for attachment to a driven shaft comprising a casing having a pair of opposed walls, each being provided with a through opening to accommodate said shaft; a first pair of gears mounted in said casing for rotation about parallel axes, one of said gears having a hub opening aligned with said casing openings, said one of said gears being constructed to be mounted on said shaft; a second pair of meshed gears mounted on said casing for rotation about axes parallel to the axes of rotation of said first pair of gears, the respective gears of said second pair being in mesh with the gears of said first pair to be driven thereby, a saw carrier mounted in said casing for reciprocating movement, a cross head rigid with said carrier, means connecting said cross head to said second pair of gears whereby rotation of said gears reciprocates said carrier and counterweights on said first pair of gears in the plane of said carrier to dynamically balance said assembly.

3. A saber saw assembly comprising a casing, a first pair of meshed gears mounted in said casing for rotation about parallel axes, one of said gears having a central opening for attachment to a power shaft; a second pair of meshed gears mounted in said casing for rotation about axes parallel to the axes of rotation of said first pair of gears, the respective gears of said second pair being in mesh with the gears of said first pair to be driven thereby; a saw carrier mounted in said casing for reciprocating movement, a cross head rigid with said carrier; means connecting said cross head to said second pair of gears whereby rotation of said gears reciprocates said carrier, and counterweights on said first pair of gears essentially in the plane of reciprocation of said carrier to dynamically balance said assembly.

4. A saber saw assembly comprising a casing, a first pair of meshed gears rotatably mounted in said casing, one of said gears having a central opening for attachment to a power shaft; a second pair of meshed gears rotatably mounted in said casing, the respective gears of said second pair being in mesh with the gears of said first pair to be driven thereby; a saw carrier mounted on said casing for reciprocating movement therein; a U-shaped cross head rigid with said carrier; a pair of rollers eccentrically carried respectively by said second pair of gears and extending into said cross head to establish a drive connection between said second pair of gears and said cross head whereby rotation of said gears reciprocates said carrier, cooperating tongue and groove constructions on said cross head and said casing to guide said cross head in its movement, wear inserts carried by said casing extending along the path of said cross head to provide wear surfaces for said cross head, and counterweights rigid with said first pair of gears and aligned with the path of said carrier to dynamically balance the forces set up by reciprocation of said carrier and said cross head.

5. A saber saw assembly for attachment to a driven shaft comprising a housing having front and rear walls provided with aligned openings to accommodate said shaft, a first pair of meshed gears, bearing means carried by said front and rear walls mounting said first pair of gears for rotation about parallel axes, one of said gears having a central hub opening aligned with the openings in said housing walls for reception of said shaft, a second pair of meshed gears mounted in said casing for rotation about axes parallel to the axes of rotation of said first pair of gears, a saw carrier mounted in said casing for reciprocating movement therein along a predetermined path, the respective gears of said second pair being in mesh with the gears of said first pair to be driven thereby, means connecting said second pair of gears and said carrier and operable to convert rotary motion of said second pair of gears to reciprocation of said carrier, and counterweights on said first pair of gears aligned with the path of movement of said carrier.

6. A saber saw assembly comprising a casing, a first pair of meshed gears rotatably mounted in said casing, one of said gears having means for attachment to a driven shaft, a second pair of meshed gears rotatably mounted in said casing, the respective gears of said second pair being in mesh with the gears of said first pair to be driven thereby, a saw carrier mounted on said casing for reciprocating movement therein along a predetermined path, means for establishing a drive connection between said second pair of gears and said carrier whereby rotation of said gears reciprocates said carrier, and counterweights rigid with said first pair of gears and aligned with the path of said carrier to dynamically balance the forces set up by reciprocation of said carrier.

References Cited by the Examiner

UNITED STATES PATENTS

| | | | |
|---|---|---|---|
| 610,987 | 9/98 | Hendrickson et al. | |
| 1,163,832 | 12/15 | Lanchester | 74—604 |
| 1,494,547 | 5/24 | Hubbard | 74—50 |
| 2,004,245 | 6/35 | Jeppsson | 74—16 |
| 2,595,464 | 5/52 | Kaufmann | 74—44 |
| 2,704,941 | 3/55 | Holford. | |
| 2,746,493 | 5/56 | Babcock | 143—68 |
| 2,775,272 | 12/56 | Papworth | 74—44 |
| 2,783,792 | 3/57 | Keesling | 143—68 X |
| 2,790,295 | 4/57 | Collins | 74—50 X |
| 2,832,229 | 4/58 | Rieser | 74—606 |
| 2,842,171 | 7/58 | Weikart et al. | 143—72 |
| 2,902,067 | 9/59 | Oakley | 143—68.5 |
| 3,056,439 | 10/62 | Hall et al. | 144—35 X |

FOREIGN PATENTS 1,052,057  9/53  France.

BROUGHTON G. DURHAM, *Primary Examiner.*

MORRIS M. FRITZ, *Examiner.*